United States Patent Office 3,133,921
Patented May 19, 1964

3,133,921
NEW DYESTUFFS OF THE ANTHRAQUINONE SERIES CONTAINING A CHLOROTRIAZINE SUBSTITUENT
Jakob Brassel and Max Staeuble, Basel, Switzerland, assignors to Ciba Corporation, a corporation of Delaware
No Drawing. Filed Sept. 22, 1961, Ser. No. 139,887
Claims priority, application Switzerland Sept. 12, 1956
3 Claims. (Cl. 260—249)

This is a continuation-in-part of our application Serial No. 682,599 filed September 9, 1957 (now abandoned).

This invention provides new water-soluble dyestuffs of the anthraquinone series which contain a monohalogen-triazine radical. These new dyestuffs contain at least two acid groups imparting solubility in water and correspond to the general formula

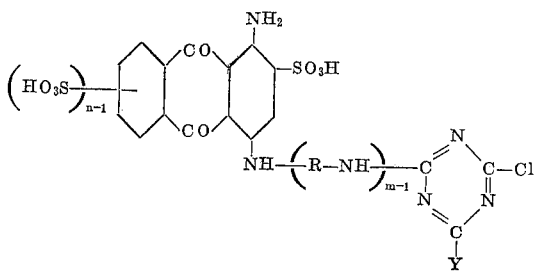

wherein $m$ and $n$ each represents a whole positive number up to and including 2, R represents a phenylene radical (including the sulfophenylene radicals) and Y is a member selected from the group consisting of the sulfophenoxy, sulfophenylamino and sulfonaphthylamino groups.

These dyestuffs are made in accordance with the invention by condensing 2:4:6-trichloro-1:3:5-triazine, on the one hand, with a water-soluble anthraquinone dyestuff of the formula

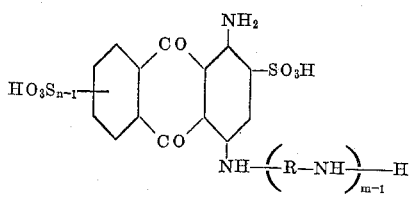

and, on the other, with a phenolsulfonic acid or with an aromatic amine containing at least one sulfonic acid group, for example, with an aminobenzene sulfonic acid or aminonaphthalene mono- or di-sulfonic acid, the condensation being carried out in such manner that a secondary condensation product is obtained which contains a halogen atom bound to the triazine nucleus.

As examples of anthraquinone dyestuffs which can be used as starting materials in the process of this invention there may be mentioned the following:

1-amino-4-(3'- or -4'-aminophenylamino)-anthraquinone-2-sulfonic acid,
1 - amino-4-(4'-aminophenylamino)-anthraquinone-2'- or 3'-sulfonic acid,
1-amino-4-(3'-amino-6'-methylphenyl-amino)-anthraquinone-2'-sulfonic acid,
1-amino-4-(3'-amino-phenylamino)-anthraquinone-4'-sulfonic acid,
1-amino-4-(4'-aminophenylamino)-anthraquinone-2:2'- or 2:3'-disulfonic acid,
1-amino-4-(3'-aminophenylamino)-anthraquinone-2:4'-disulfonic acid,
1-amino-4-(3'-aminophenylamino)-anthraquinone-2:3': 5-, 2:3':6-, 2:3':7- or 2:3':8-trisulfonic acid,
1-amino-4-(4'-aminophenylamino)-anthraquinone-2:2': 5-trisulfonic acid,
1-amino-4-(3'-aminophenylamino)-anthraquinone-2:4': 8-trisulfonic acid,
1-amino-4-[4'-(4''-aminophenyl)-phenylamino]-anthraquinone-2:3''-disulfonic acid,
1-amino-4-[4'-(4''-aminophenylazo)phenylamino]-anthraquinone-2:2'':5-trisulfonic acid,
1-amino-4-(4'-amino-3'-carboxyphenylamino)-anthraquinone-2:5-disulfonic acid,
1-amino-4-(3'-aminophenylamino)-anthraquinone-2:5: 4'-trisulfonic acid,
and also 1:5-dioxy-4:8-diaminoanthraquinone-2:6-disulfonic acid and 1:4-diaminoanthraquinone-2-sulfonic acid.

In the process of this invention, for example, one molecular proportion of cyanuric chloride may be reacted with one molecular proportion of a phenolsulfonic acid or with one molecular proportion of an aminobenzene sulfonic acid. As such compounds there may be mentioned ortho-, meta- or para-aminobenzene sulfonic acid and 1-aminobenzene-2:5-disulfonic acid, aminonaphthalene sulfonic acids, such as 1-aminonaphthalene-4-, -5-, -6- or -7-sulfonic acid, 2-aminonaphthalene-4-, -6- or -8-sulfonic acid, 1-aminonaphthalene-3:6-disulfonic acid, 2-aminonaphthalene-4:8-, 5:7- or 6:8-disulfonic acid.

The condensation of the trihalogen-triazines with the compounds mentioned above to form primary condensation products is advantageously carried out in the presence of an acid-binding agent, such as sodium acetate, sodium hydroxide or sodium carbonate, and under conditions such that two exchangeable halogen atoms remain in the product obtained, that is to say, for example, in an organic solvent or at a relatively low temperature in an aqueous medium. The primary condensation products so obtained are further condensed to secondary condensation products advantageously at a somewhat raised temperature, for example, within the range of 30–90° C., and advantageously 55–80° C. In this manner the condensation proceeds more rapidly and more completely than at lower temperatures, and it is surprising that the third chlorine atom of the cyanuric chloride used is not attacked.

The products of the Formula 1 are new. They are valuable dyestuffs which are suitable for dyeing or printing a very wide variety of materials, especially polyhydroxylated materials of fibrous structure such as cellulose-containing substances, and also synthetic fibers, for example, of regenerated cellulose or viscose, or natural materials, for example, linen, cellulose or above all cotton. They are suitable for dyeing by the so-called direct dyeing method and also by the pad dyeing method, especially from aqueous alkaline solutions, which may have a high concentration of a salt, for example, by the process in which the dyestuffs are fixed on the material to be dyed by means of an acid binding agent in the warm.

Notwithstanding that they contain a labile halogen-atom the dyestuffs of this invention can be isolated without losing their valuable properties, and worked up into useful dry dyestuff preparations. They are advantageously isolated by salting out and filtration. The dyestuffs which have been filtered off may be dried, if desired, after the addition of diluents. It is of advantage to carry out the drying at not too high a temperature and under reduced pressure. In some cases dry preparations can be prepared in accordance with the invention by spray drying the mixture resulting from the preparation of the dyestuff, that is to say, without first separating the dyestuff.

In this manner new valuable dry preparations are obtained which are suitable for the preparation of stock solutions or dyebaths, and, if desired, also printing pastes.

Dyeings produced on cellulose-containing fibers with the new dyestuffs of the Formula 1 are usually distinguished by the purity of their tints, their good fastness to chlorine and light and especially by their excellent fastness to washing.

The following examples illustrate the invention, the parts and percentages being by weight unless otherwise stated and the relationship of parts by weight to parts by volume being the same as that of the kilogram to the liter:

*Example 1*

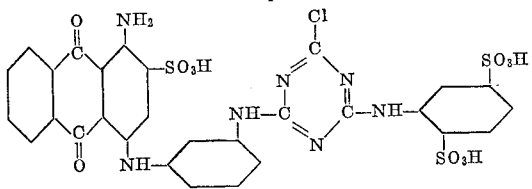

100 parts of ice are added to 20 parts of cyanuric chloride in 80 parts of acetone. To the suspension of cyanuric chloride so obtained there is added a solution, cooled to 0° C., of 32.7 parts of the disodium salt of 1-aminobenzene-2:5-di-sulfonic acid in 330 parts of water. To the mixture there are introduced dropwise in the course of 2 hours 55 parts by volume of a 2 N-solution of sodium carbonate, the temperature being maintained at 2–4° C. by the external cooling. There is obtained a clear solution of the condensation product of equimolecular quantities of cyanuric chloride and 1-aminobenzene-2:5-disulfonic acid, which may, if necessary, be filtered to remove small amounts of undissolved impurities.

The solution so obtained is added without delay to a solution having a temperature of 40° C. of 43.1 parts of the sodium salt of 1-amino-4-(3'-aminophenylamino)-anthraquinone 2-sulfonic acid and 5.3 parts of sodium carbonate in 2000 parts of water. The reaction mixture is heated to 35–40° C. and stirred for one hour at that temperature. The dyestuff so obtained is precipitated by the addition of sodium chloride, filtered off and dried in vacuo at 90° C. It is a dark colored substance which dyes cotton in the manner described below reddish blue tints which are fast to light and washing.

1 part of the dyestuff is dissolved in 100 parts of water. A fabric of staple fibers of regenerated cellulose as impregnated in the resulting solution so that its weight increase is 75%, and then the fabric is dried. The fabric is then impregnated with a solution at 20° C. which contains, per liter, 10 grams of sodium hydroxide and 300 grams of sodium chloride, the fabric is squeezed to a weight increase of 75%, and the dyeing is steamed for 60 seconds at 100–101° C., rinsed, treated in a sodium bicarbonate solution of 0.5% strength, rinsed, soaped for ¼ hour in a boiling solution of 0.3% strength of a non-ionic detergent, rinsed and dried.

If the steaming operation is omitted practically the whole of the dyestuff is washed out during the soaping operation.

A similar good result is obtained by using a cotton fabric, instead of a fabric of staple fibers of regenerated cellulose.

Similar dyestuffs which dye cotton and regenerated cellulose the tints given in column III of the following table are obtained in the above example by using, instead of 1-amino-4-(3'-aminophenylamino)-anthaquinone-2-sulfonic acid, equimolecular quantities of the starting dyestuffs given in column II:

| I | II | III |
|---|----|-----|
| 1 | (anthraquinone with NH₂, SO₃H, NH–C₆H₄–NH–CH₃, NH–C₆H₅) | Reddish blue. |
| 2 | (anthraquinone with NH₂, SO₃H, NH–C₆H₄–NH–C₂H₅, NH–C₆H₅) | Do. |
| 3 | (anthraquinone with NH₂, SO₃H, NH–C₆H₄–NH₂) | Blue. |
| 4 | (anthraquinone with NH₂, SO₃H, NH–C₆H₄(SO₃H)–NH₂) | Do. |
| 5 | (anthraquinone with NH₂, SO₃H, NH–C₆H₃(SO₃H)–NH–CH₃) | Do. |
| 6 | (anthraquinone with NH₂, SO₃H, NH–C₆H₃(SO₃H)–NH₂) | Do. |
| 7 | (anthraquinone with NH₂, SO₃H, NH–C₆H₃(NH₂)–Cl) | Do. |
| 8 | (anthraquinone with NH₂, SO₃H, NH–C₆H₃(COOH)–NH₂) | Do. |

Example 2

100 parts of ice are added to a solution of 20 parts of cyanuric chloride in 80 parts of acetone. The resulting suspension of cyanuric chloride is added to a solution, cooled to 0° C., of 21.5 parts of the sodium salt of 1-aminobenzene-3-sulfonic acid in 330 parts of water. To the mixture are added dropwise in the course of 5 minutes 55 parts by volume of a 2 N-solution of sodium carbonate, the temperature being maintained below 5° C. by external cooling. There is obtained a clear solution of the condensation product of equimolecular quantities of cyanuric chloride and 1-amino-benzene-3-sulfonic acid, and, if necessary, small amounts of undissolved impurities may be filtered off.

The solution so obtained is added without delay to a solution at 40° C. of 53.3 parts of the disodium salt of 1-amino-4-(4′-aminophenylamino)-2:3′-disulfonic acid and 5.3 parts of sodium carbonate in 1000 parts of water. The reaction mixture is heated to 40–50° C. and stirred for 2 hours at that temperature. The dyestuff so obtained is precipitated by the addition of sodium chloride, filtered off and dried in vacuo at 90° C. There is obtained a dark colored substance which dyes cotton and regenerated cellulose by the process described in Example 1 blue tints which are fast to washing and light.

Similar dyestuffs, which dye cotton and regenerated cellulose blue tints, are obtained by using in this example, instead of 1-amino-4-(4′-aminophenylamino)-anthraquinone-2:3′-disulfonic acid the compounds named in column II of the following table, and by using instead of 1-aminobenzene-3-sulfonic acid, the corresponding quantity of the compounds given in column III in the form of their neutral sodium salts.

| I | II | III | IV |
|---|---|---|---|
| 1 | (anthraquinone structure with $NH_2$, $SO_3H$, $HO_3S$, $NH$-phenyl-$NH$-$CH_3$) | $NH_2$-phenyl-$SO_3H$ | Reddish blue. |
| 2 | (anthraquinone structure with $NH_2$, $SO_3H$, $HO_3S$, $NH$-phenyl-$NH$-$C_2H_5$) | $NH_2$-phenyl-$SO_3H$ | Greenish blue. |
| 3 | (anthraquinone structure with $HO_3S$, $NH_2$, $SO_3H$, $NH$-phenyl($NH_2$)-$Cl$) | $NH_2$-phenyl-$SO_3H$ | Blue. |
| 4 | (anthraquinone structure with $NH_2$, $SO_3H$, $HO_3S$, $NH$-phenyl-$NH_2$) | $NH_2$-phenyl-$SO_3H$ | Greenish blue. |
| 5 | (anthraquinone structure with $NH_2$, $SO_3H$, $NH$-phenyl-$NH_2$, $SO_3H$) | $NH_2$-phenyl($CH_3$)-$SO_3H$ | Do. |
| 6 | (anthraquinone structure with $NH_2$, $SO_3H$, $HO_3S$, $NH$-phenyl-$NH_2$, $SO_3H$) | $NH_2$-phenyl-$SO_3H$ | Do. |

| I | II | III | IV |
|---|---|---|---|
| 7 | (anthraquinone structure with NH₂, SO₃H, NH—phenyl—NH₂, SO₃H) | (aminoanisole sulfonic acid: H₃CO, NH₂, SO₃H) | Greenish blue. |
| 8 | (anthraquinone structure with NH₂, SO₃H, NH—phenyl—NH₂, SO₃H) | (naphthalene with NH₂, HO₃S, SO₃H) | Do. |
| 9 | (anthraquinone with HO₃S, NH₂, SO₃H, NH—phenyl—NH₂, SO₃H) | (naphthalene with H₂N, SO₃H) | Do. |
| 10 | (anthraquinone with NH₂, SO₃H, NH—phenyl(NH₂)(SO₃H)) | (aniline with NH₂, SO₃H) | Blue. |
| 11 | (anthraquinone with NH₂, SO₃H, NH—phenyl(HO₃S)(NH₂)(SO₃H)) | (aniline with NH₂, SO₃H) | Do. |
| 12 | (anthraquinone with NH₂, SO₃H, NH—phenyl(HO₃S)(NH₂)(SO₃H)) | (aniline with NH₂, SO₃H) | Do. |

The 1-amino-4-(3′-aminophenylamino)-anthraquinone-2:4′:6′-trisulfonic acid used for making the dyes Nos. 11 and 12 of the table can be obtained by sulfonation of the (1 - amino - (3′-aminophenylamino)-anthraquinone-2-sulfonic acid with forming sulfuric acid containing 28 percent of sulfur trioxide.

*Example 3*

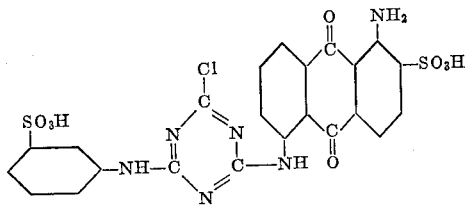

100 parts of ice are added to a solution of 18.5 parts of cyanuric chloride in 80 parts of acetone. To the resulting suspension of cyanuric chloride there is added a solution, cooled to 0° C., of 19.5 parts of the sodium salt of 1-amino-benzene-3-sulfonic acid in 300 parts of water. There are immediately added dropwise to the mixture 55 parts by volume of a 2 N-solution of sodium carbonate, the pH value being maintained between 5.0 and 7.0 and the temperature being maintained at 0–4° C. by external cooling. There is obtained a clear solution of the primary condensation product of equimolecular quantities of cyanuric chloride and 1-amino-benzene-3-sulfonic acid, that is to say, a solution of 2:4-dichloro-6-phenylamino-1:3:5-triazine-3′-sulfonic acid.

To the solution so obtained is then added a solution at 70° C. of 34 parts of sodium 1:5-diaminoanthraquinone-2-sulfonate in 1000 parts of water, and there are gradually added at 65–70° C. 55 parts by volume of a 2 N-solution of sodium carbonate so as to maintain the pH value between 5.0 and 7.0 Towards the end the mixture is stirred for one hour at 65° C., the pH value remaining constant between 6.5 and 7.0. The dyestuff is then precipitated from the solution in the form of fine needles by the addition of sodium chloride, and filtered off after being cooled. The filter residue is washed with a soduim chloride solution of 20% strength and the dyestuff is dyed in vacuo at 70° C.

Cotton or regenerated cellulose is dyed with the dyestuff by the procedure described in Example 1 to give red-orange tints which are very fast to washing, chlorine and light.

*Example 4*

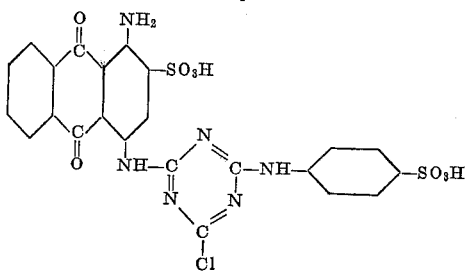

100 parts of ice are added to a solution of 18.5 parts of cyanuric chloride in 80 parts of acetone. To the resulting fine suspension of cyanuric chloride is added a solution, cooled to 0° C. of 19.5 parts of the sodium salt of 1-aminobenzene-4-sulfonic acid in 300 parts of water. 55 parts by volume of a 2 N-solution of sodium carbonate are then immediately run in such manner as to maintain the pH value between 5.0 and 7.0. The temperature is maintained between 0 and 4° C. by external cooling. Towards the end the suspension of the 2:4-dichloro-6-phenylamino-1:3:5-triazine-4'-sulfonic acid which precipitates in the form of colorless crystals, is heated to 40° C., and a solution at 70° C. of the sodium salt of 34 parts of 1:4-diaminoanthraquinone-2-sulfonic acid in 1000 parts of water is added. There are also added gradually dropwise at 60–65° C. 55 parts by volume of a 2 N-solution of sodium carbonate at a pH value of 5.5 to 7.0. After being stirred for further 30 minutes at 65° C., the dyestuff is salted out with sodium chloride. It precipitates in hair-fine blue-violet needles which are filtered off, after cooling the mixture to room temperature, and then washed with sodium chloride solution of 10% strength. The dyestuff can be dried in the usual manner at 70–80° C. in vacuo.

Cotton or regenerated cellulose are dyed by the procedure described in Example 1 blue-violet tints of very good fastness to light and washing.

Similar dyestuffs are obtained by using in this Example instead of 1-aminobenzene-4-sulfonic acid, 1-aminobenzene-3-sulfonic acid or 1-aminobenze-2-sulfonic acid or 2-aminonaphthalene-6-sulfonic acid or 2-aminonaphthalene-4:8-disulfonic acid.

*Example 5*

A solution of 19 parts of cyanuric chloride in 80 parts of acetone is added to a solution, cooled to 0° C. by the addition of ice, of 53.3 parts of the disodium salt of 1-amino-4-(4'-aminophenylamino)-anthraquinone - 2:5-disulfonic acid in 2000 parts of water. The reaction mixture is stirred for about 40 minutes at 0–5° C., during which the pH value of the mixture is maintained between 5 and 7.5 by the addition of a total of about 52 parts by volume of a 2 N-solution of sodium hydroxide. The dyestuff formed is dissolved. A test portion diluted with water gives on filter paper a blue outspread which when dabbed with 2 N-acetic acid no longer shows a change of tint to red. After the addition of a solution of 23.5 parts of the sodium salt of 1-hydroxybenzene-3-sulfonic acid in 300 parts of water, the reaction mixture is heated to 35–40° C. and stirred for 3 hours at that temperature, during which the pH value is maintained between 7 and 8 by the addition of a total of about 50 parts by volume of a 2 N-solution of sodium hydroxide. The dyestuff formed is precipitated by the addition of sodium chloride, filtered off and dried in vacuo at 90° C. It is a dark colored substance which dyes cotton and regenerated cellulose by the method described in Example 1 blue tints which are fast to washing and light.

What is claimed is:

1. The water-soluble anthraquinone dyestuff of the formula

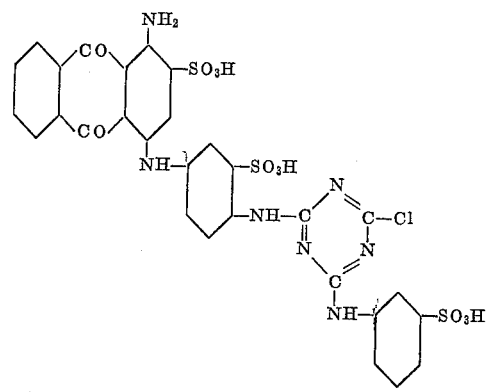

2. The water-soluble anthraquinone dyestuff of the formula

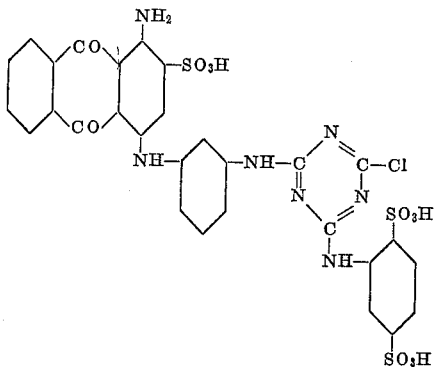

3. The water-soluble dyestuff of the formula

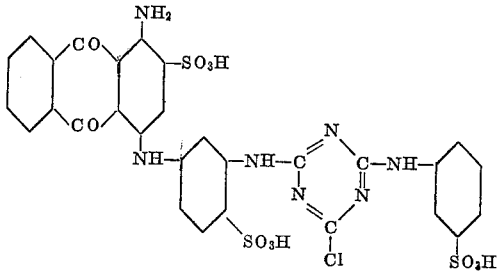

References Cited in the file of this patent

UNITED STATES PATENTS

| | | |
|---|---|---|
| 1,625,530 | Fritzsche et al. | Apr. 19, 1927 |
| 2,773,871 | Brassel et al. | Dec. 11, 1956 |

FOREIGN PATENTS

| | | |
|---|---|---|
| 467,815 | Great Britain | June 23, 1932 |
| 466,886 | Great Britain | June 4, 1937 |